United States Patent
Inoue et al.

(10) Patent No.: US 8,724,008 B2
(45) Date of Patent: May 13, 2014

(54) IMAGE PROCESSING APPARATUS, IMAGE PICKUP APPARATUS, IMAGE PROCESSING METHOD, AND PROGRAM FOR PERFORMING IMAGE RESTORATION

(75) Inventors: Chiaki Inoue, Utsunomiya (JP); Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 305 days.

(21) Appl. No.: 13/075,561

(22) Filed: Mar. 30, 2011

(65) Prior Publication Data

US 2011/0242373 A1 Oct. 6, 2011

(30) Foreign Application Priority Data

Mar. 31, 2010 (JP) .................................. 2010-080747

(51) Int. Cl.
*H04N 5/232* (2006.01)
*H04N 9/083* (2006.01)
*G06K 9/00* (2006.01)

(52) U.S. Cl.
USPC ............................ 348/345; 348/270; 382/162

(58) Field of Classification Search
USPC ........ 348/223.1, 240.1–240.3, 240.99, 229.1, 348/242, 270, 273, 345, 353; 382/167
See application file for complete search history.

(56) References Cited

U.S. PATENT DOCUMENTS

| | | | |
|---|---|---|---|
| 7,433,069 B2 * | 10/2008 | Masuda et al. ............... | 358/1.15 |
| 8,040,412 B2 * | 10/2011 | Yamamoto .................... | 348/273 |
| 8,199,209 B2 | 6/2012 | Ono | |
| 8,417,031 B2 | 4/2013 | Kasahara | |
| 2007/0285553 A1 * | 12/2007 | Morita et al. ................. | 348/335 |
| 2009/0190008 A1 * | 7/2009 | Kasahara ...................... | 348/242 |
| 2010/0157127 A1 * | 6/2010 | Takayanagi et al. ..... | 348/333.02 |

FOREIGN PATENT DOCUMENTS

| | | |
|---|---|---|
| JP | 10-319518 A | 12/1998 |
| JP | 2008-85773 A | 4/2008 |
| JP | 2008-211679 A | 9/2008 |
| JP | 2009-188676 A | 8/2009 |
| JP | 2009-212818 A | 9/2009 |

* cited by examiner

Primary Examiner — Trung Diep
(74) Attorney, Agent, or Firm — Rossi, Kimms & McDowell LLP (57) ABSTRACT

An image processing apparatus obtains a plurality of pre-restoration images of an object for chromatic components when these images are taken at a first in-focus position to a third in-focus position corresponding to the RGB chromatic components, obtains an image pickup state and an image restoration filter corresponding to the image pickup state for each chromatic component, restores the pre-restoration image at an in-focus position for each chromatic component utilizing the obtained image restoration filter, and synthesizes the restored images.

5 Claims, 5 Drawing Sheets

IMAGE PROCESSING APPARATUS, IMAGE PICKUP APPARATUS, IMAGE PROCESSING METHOD, AND PROGRAM FOR PERFORMING IMAGE RESTORATION

BACKGROUND OF THE INVENTION

1. Field of the Invention

The present invention relates to an image processing apparatus, an image pickup apparatus, an image processing method, and a program.

2. Description of the Related Art

There is known a method for restoring an image based on an optical transfer function ("OTF") or a point spread function ("PSF") of an image pickup system (Japanese Patent Laid-Open No. ("JP") 2008-211679). Other prior art include JPs. 2008-85773 and 10-319518.

The conventional image restoration may cause a false color due to a chromatic aberration. For instance, assume a first object and a second object in a screen where among lights of the RGB wavelength regions, the G light is focused on and the R light is defocused from the first object due to the chromatic aberration, and the R light is focused on and the G light is defocused from the second object due to the chromatic aberration.

According to the conventional image restoration, the OTF of an image pickup state of the first object for each of the RGB lights is utilized for the image restorations of both the first object and the second object. As a result, an image of the first object is properly restored whereas a restored image of the second object may be greenish (or a false color may be generated). This is because although a relationship in which the G light is focused and the R light is defocused from the first object is inverted in the second object, the OTF that reflects the pre-inversion relationship is used for the second object.

SUMMARY OF THE INVENTION

An image processing apparatus according to the present invention includes an image obtaining unit configured to obtain a plurality of images for lights of a plurality of wavelength regions by taking each image of an object at each in-focus position corresponding to the light of each wavelength region via an optical system, an image pickup information obtaining unit configured to obtain an image pickup state when each of the plurality of images is obtained, an optical transfer function obtaining unit configured to obtain an amount corresponding to an optical transfer function of the optical system at each image pickup state, an image restoration unit configured to restore the image for each wavelength region using the image and the amount corresponding to the optical transfer function, and an image synthesizer configured to synthesize a plurality of images that have been restored by the image restoration unit. When there are a first object and a second object in a screen, the image restoration unit uses the amount corresponding to the optical transfer function for each wavelength region used to take the image of the first object at an in-focus position corresponding to the light of each wavelength region to restore images of both the first object and the second object.

Further features of the present invention will become apparent from the following description of exemplary embodiments with reference to the attached drawings.

DESCRIPTION OF THE EMBODIMENTS

Figure 1:
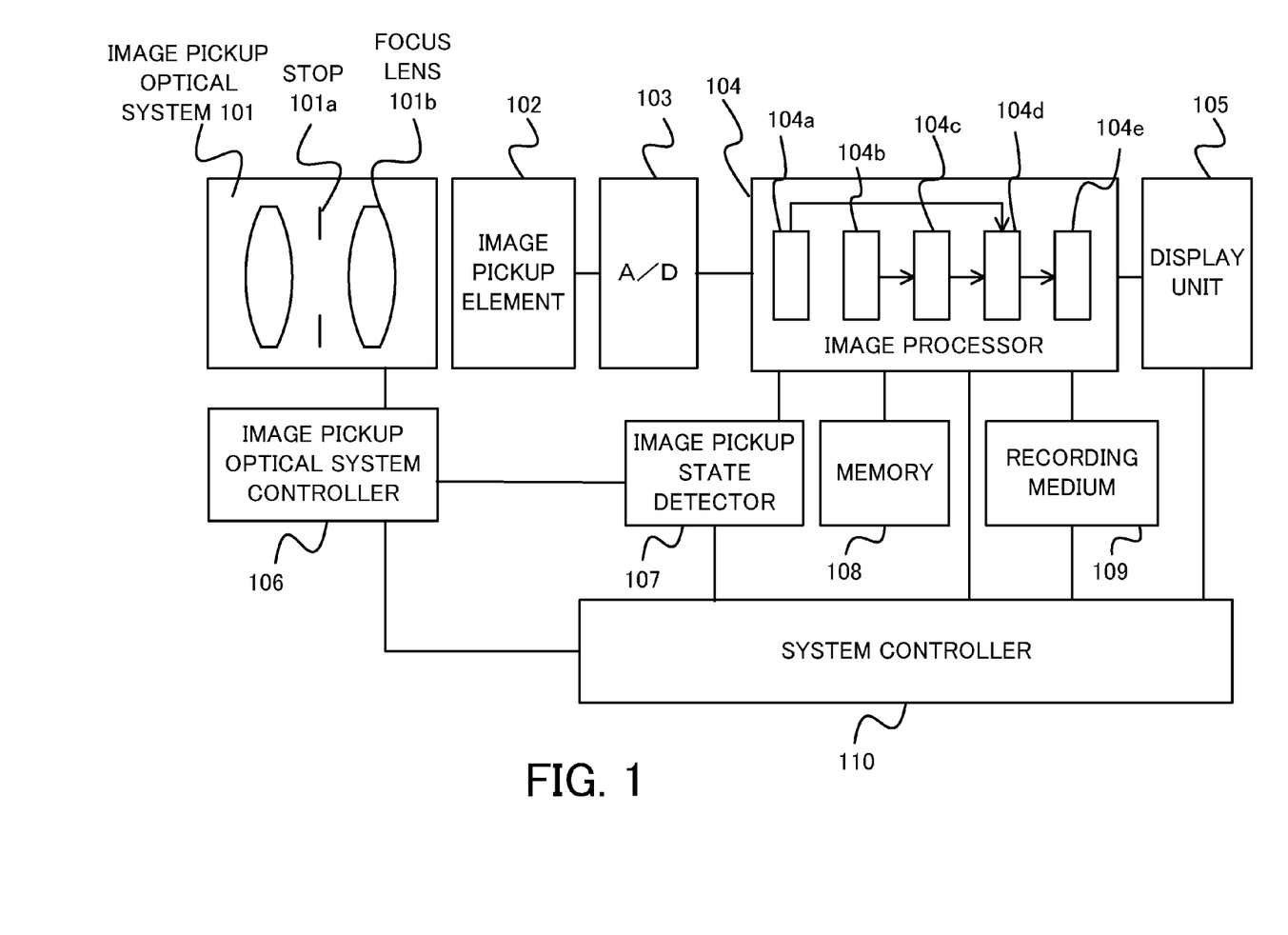
FIG. 1 is a block diagram of an image pickup apparatus of this embodiment.

FIG. 1 is a block diagram of an image pickup apparatus of this embodiment. The image pickup apparatus includes an image pickup optical system 101, an image pickup element 102, an A/D converter 103, an image processor 104, a display unit 105, an image pickup optical system controller 106, an image pickup state detector 107, a memory 108, a recording medium 109, and a system controller 110.

The image pickup apparatus does not limit its type, such as a digital camera and a digital video camera. The image pickup optical system 101 may be integrated with an image pickup apparatus (as a single-lens reflex camera) or configured replaceable from the image pickup apparatus. In this embodiment, each pixel of an image has a signal value for each color component of R (red), G (green), and B (blue), but the image processing method of this embodiment is applicable so as to form an image having two or more colors.

The image pickup optical system 101 forms an optical image of an object and contains a variety of aberrations, such as a longitudinal chromatic aberration, a spherical aberration of a color, and a coma of a color. Thus, the optical image of the object may deteriorate due to these aberrations. The image pickup optical system 101 includes a magnification varying lens (zoom lens) used for image magnifications, a stop 101a, and a focus lens 101b used for focusing.

The stop 101a varies an aperture diameter. Each of the magnification varying lens and the focus lens 101b is configured movable along the optical axis direction by a driver (not illustrated), and the driver (such as a stepping motor) is controlled by the image pickup optical system controller 106. The focus lens 101b or the like is simplified as a single lens in FIG. 1.

The image pickup element 102 is a CCD or a CMOS configured to photoelectrically convert an optical image of an object into an analog signal. The A/D converter 103 converts the analog signal converted by the image pickup element 102 into a digital signal.

The image processor 104 performs predetermined processes containing an image restoration, and includes an image obtaining unit 104a, an image pickup information obtaining unit 104b, a filter selector 104c, an image restoration unit 104d, and an image synthesizer 104e.

The image obtaining unit 104a is configured to obtain from the A/D converter 103 a plurality of images for light of each wavelength region obtained through image pickup of an object at an in-focus position via the image pickup optical system 101 using light of each of a plurality of wavelength regions. This image is a deteriorated image of an original image (post-restoration image) as an original object image, and the deterioration is caused by a variety of aberrations of the image pickup optical system 101.

The image pickup information obtaining unit 104b is configured to obtain from the image pickup state detector 107 information of an image pickup state (condition of photography) when the plurality of images are obtained. The image pickup state can contain a magnification varying position, a focal length, a stop value (F number), a photography distance, an ISO sensitivity, and a white balance.

The filter selector 104c is configured to select one of a plurality of image restoration filters stored in the memory 108. While this embodiment utilizes an image restoration filter for an image restoration, the image restoration may use an optical transfer function ("OTF") and another function.

Therefore, the filter selector 104c serves as one example of an OTF obtaining unit configured to obtain an OTF of the image pickup optical system 101 corresponding to the image pickup state or its corresponding amount (a PSF, aberrational information or a generalized OTF which will be described later) for light of each wavelength region. In this case, the OTF is previously stored as an optical design value corresponding to the image pickup state in the memory 108.

In the image restoration, the following expression is established where g(x, y) denotes a pre-restoration image, f(x, y) denotes an original image, h(x, y) denotes a point spread function ("PSF"), denotes a convolution, and (x, y) denotes a coordinate on an image.

$$g(x,y)=h(x,y)*f(x,y) \quad (1)$$

Fourier-transformed Expression 1 has a product format for each frequency as follows, where H denotes an OTF and (u, v) denotes a coordinate on a two-dimensional frequency surface or a frequency:

$$G(u,v)=H(u,v) \cdot F(u,v) \quad (2)$$

The original image f(x, y) is obtained as a restored image by dividing both sides of Expression 2 by H and by performing an inverse Fourier transformation for F(u, v) so as to return it a real surface.

The following expression is established by setting inversely Fourier-transformed $H^{-1}$ to R. The original image can be similarly obtained by performing a convolution for an image on a real surface.

$$g(x,y)*R(x,y)=f(x,y) \quad (3)$$

R(x, y) corresponds to an image restoration filter. The image restoration filter may utilize a Wiener filter by considering noise components contained in an actual image. One method for correcting a deteriorated color blur component of an image corrects the blur component and makes uniform the blur amounts among chromatic components of an image. Since the OTF fluctuates in accordance with the image pickup state such as a magnification varying position and a stop diameter, the image restoration filter may be changed accordingly.

The OTF can contain a factor that deteriorates the OTF for an image input to the image processor 104. For example, a low-pass filter restrains a high frequency component of an OTF's frequency characteristic, and a shape and an aperture ratio of a pixel opening of the image pickup element 102, a spectral characteristic of a light source, and spectral characteristics of a variety of types of wavelength filters affect the frequency characteristic. This embodiment produces an image restoration filter based on the generalized OTF including them.

The image restoration unit 104d is configured to restore an image using the selected image restoration filter in this embodiment. The image restoration filter may be a two-dimensional filer obtained by performing an inverse Fourier transformation for a function generated based on the inverse function of the OTF. In this case, the image restoration unit 104d convolutes the image restoration filter for the (pre-restoration) image (image signal).

The number of taps in the image restoration filter may be determined based on an aberrational amount of the image pickup optical system 101, and each tap corresponds to one pixel of an image and is convoluted in an image restoration. When the image restoration filter utilizes a two-dimensional filter in which each of the length and width are divided into 100 or more, an image can be restored against aberrations that widely spread from the imaging position of the image pickup optical system 101. By convoluting the image restoration filter with the input image in the real space, the image can be restored without performing any Fourier transformations in the image pickup apparatus. The taps in the image restoration filter do not have to form a square arrangement.

The image restoration corresponds to a correction of a component deteriorated by the aberration in the image, or an improvement of the MTF. The image restoration filter is a convolution filter of a real surface, and has effects of improving the MTF and actually an amplitude component of the OTF on the frequency surface, and of correcting a phase shift component of the OTF.

Since the image restoration filter is not necessarily used for the image restoration of this embodiment, it is sufficient that the image restoration unit 104d can restore a pre-restoration image into an original image for each wavelength region based on a relationship among the pre-restoration image, an amount corresponding to the OTF, and the original image. When the OTF uses the generalized OTF, a relationship other than Expressions 1-3 may be used.

For example, when the image restoration unit 104d utilizes a function generated based on the inverse function of the OTF instead of the image restoration filter, the image restoration unit 104d may provide a de-convolution for a Fourier transformation of a pre-restoration image in the frequency space.

Assume that there are a first object and a second object in a screen, and a certain image of the first object has been obtained at an in-focus position for light of each of the RGB wavelength regions. Then, the image restoration unit 104d uses the OTF of each of the RGB lights for the first object to restore the images of both the first object and the second object. An effect of this embodiment is particularly remarkable when the first object and the second object have different object distances.

The conventional image restoration employs the OTF of each of the RGB lights for the first object to restore the images of both the first object and the second object, when the G light is focused on and the R light is defocused from the first object and the R light is focused on and the G light is defocused from the second object. However, this method causes a false color because although a relationship in which the G light is focused on and the R light is defocused from the first object is inverted for the second object, the OTF that reflects the pre-inversion relationship is used for the second object.

On the other hand, according to the image restoration of this embodiment, each of the RGB lights is focused on the first object and each of the RGB lights is defocused from the second object. Thus, the focus and defocus relationship is not inverted between the first object and the second object, and thus no false colors occur.

This embodiment utilizes different image restoration filters for respective wavelength regions for the image restorations. However, a common image restoration filter may be used for two different wavelength regions (such as the B light and the R light) as long as aberrational influences of the image pickup optical system 101 on these two wavelength regions are similar to each other.

The image synthesizer 104e generates a color image by synthesizing a plurality of original images that have been restored, for the RGB wavelength regions.

The display unit 105 includes a liquid crystal display, and is configured to display an image, such as a pre-restoration image, an original image (or a post-restoration image), and another processed image.

The image pickup optical system controller 106 controls an operation (including a driving timing, a driving amount, and a driving direction) of each of the drivers, such as a stepping motor, (not illustrated) configured to drive the magnification varying lens and the focus lens 101b of the image pickup optical system 101.

The image pickup state detector 107 detects an image pickup state of the image pickup apparatus. The image pickup state detector 107 may obtain information of the image pickup state directly from the system controller 110 or the information on the image pickup optical system 101 may be obtained from the image pickup optical system controller 106.

The memory 108 stores a plurality of image restoration filters (digital filters) used for the image restoration, and other information. The recording medium 109 may be a memory card. When the image processing apparatus is a PC, etc., the recording medium may be a hard disk drive (HDD), a semiconductor memory, and a variety of storing disks.

The system controller 110 serves as a controller configured to control an operation of each component of the image pickup apparatus, and includes a microcomputer (or processor).

Figure 2:
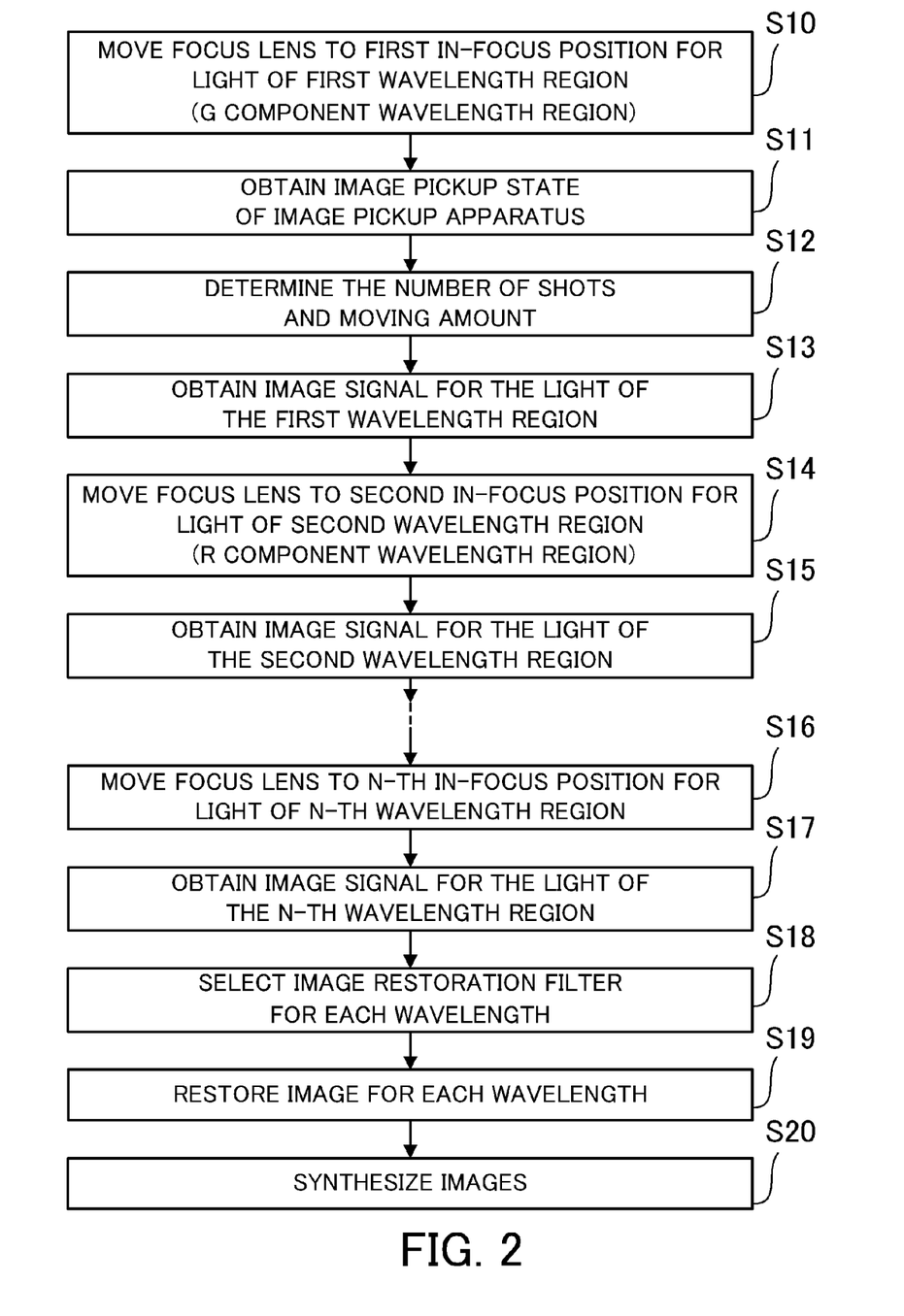
FIG. 2 is a flowchart for explaining an operation of a system controller illustrated in FIG. 1.

FIG. 2 is a flowchart for explaining an image pickup operation executed by the system controller 110, and "S" stands for a step. The image processing method of this embodiment can be implemented as a computer executable program.

Initially, the system controller 110 moves the focus lens 101b to a first in-focus position via the image pickup optical system controller 106 so that light of a first wavelength region, e.g., the G light, from a specific surface of a main object forms an image on the image pickup surface of the image pickup element 102 (S10). A detector of the in-focus position may use a method, such as a contrast detecting method or a phase difference detection method.

Next, the system controller 110 obtains information of an image pickup state from the image pickup state detector 107 via the image pickup information obtaining unit 104b in the image processor 104 (S11).

Next, the system controller 110 obtains the number of shots suitable for the image pickup state, and a moving amount of the focus lens 101b so as to form an image of light in a second wavelength region, e.g., the R light, and an image of light in a third wavelength region, e.g., the B light, on the image pickup element 102 (S12).

The determination of the number of shots may use items that optimize the image quality for indexes, such as the number of chromatic components, a noise amount, and a dynamic range. In addition, the moving amount of the focus lens 101b is an amount used to correct the longitudinal chromatic aberration of the image pickup optical system 101 and has a peculiar value depending upon the image pickup state, and thus may be previously prepared as a table in the memory 108.

Next, the system controller 110 obtains an image signal (pre-restoration image) for the light of the first wavelength region (S13).

Next, the system controller 110 moves the focus lens 101b to the previously calculated second in-focus position for the light of the second wavelength region (S14), and obtains an image signal (pre-restoration image) for the light of the second wavelength region (S15).

Similarly, the system controller 110 moves the focus lens 101b to the third in-focus position corresponding to the light of the third wavelength region, and obtains an image signal (pre-restoration image) for the light of the third wavelength region.

While this embodiment adopts the RGB configuration, the system controller 110 repeats a similar procedure if four or more colors of image signals are used (S16, S17). The "light of a plurality of wavelength regions" is light of each of the RGB wavelength regions in this embodiment, but when the aberrational influences of the image pickup optical system 101 on the R light and the B light are similar, S16 and S17 may be performed for one of the R light and the B light. In other words, S16 and S17 do not have to be necessarily performed for the light of all wavelength regions.

Figure 3:
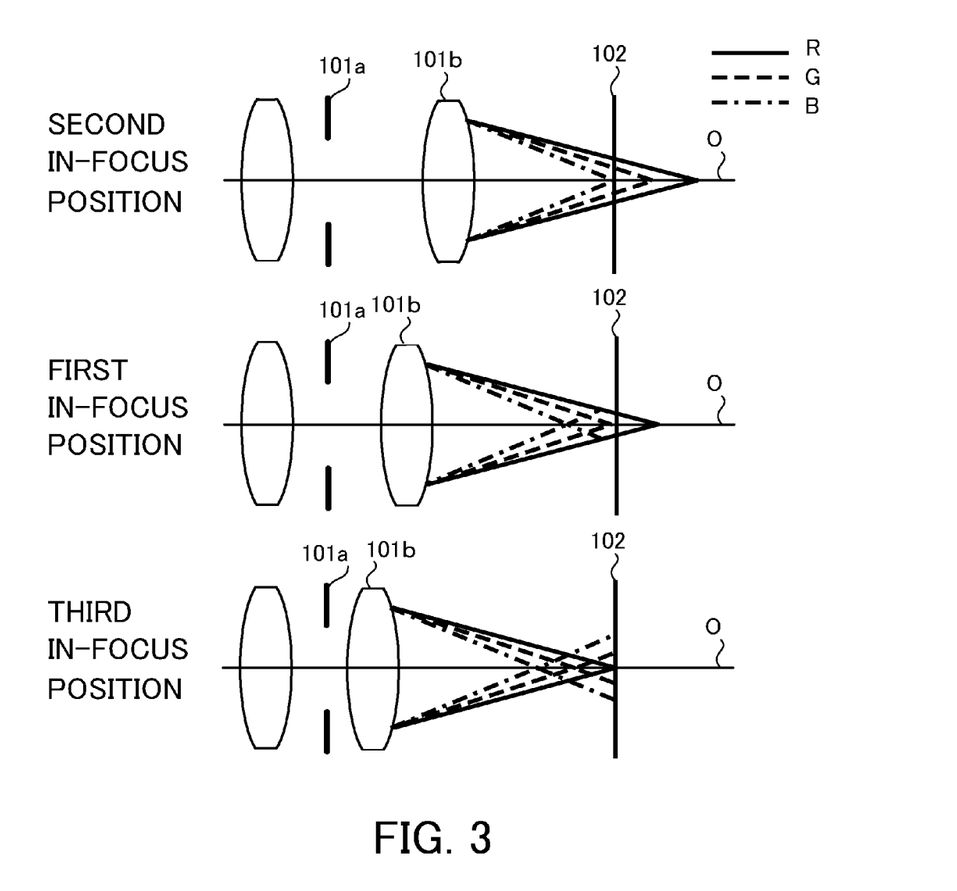
FIG. 3 illustrates sectional views illustrating in-focus positions of a focus lens illustrated in FIG. 1 when an image signal for light of each wavelength region is obtained.

FIG. 3 illustrates sectional views of in-focus positions (such as the first in-focus position to the third in-focus position) of the focus lens 101b when the image signal for the light of each wavelength region is obtained. Since the image pickup optical system 101 has a longitudinal chromatic aberration, as illustrated in FIG. 3, the imaging position is different in the optical axis direction O for each wavelength region. This embodiment obtains an image signal for the light of each wavelength region by driving the focus lens 101b in the optical axis direction and by forming an image for the light of each wavelength region on the image pickup surface of the image pickup element 102 (S13, S15, S17).

Next, the system controller 110 selects an image restoration filter suitable for the image pickup state at the in-focus position for the light of each wavelength region from among a plurality of image restoration filters stored in the memory 108, using the filter selector 104c of the image processor 104 (S18).

In this embodiment, the system controller 110 produces three image restoration filters corresponding to each of the RGB chromatic components for an RGB format color image. The image pickup optical system 101 has a chromatic aberration, and a blur behavior is different for each chromatic component. Thus, an image restoration filter of each chromatic component has a different characteristic (section) due to a chromatic aberration.

The system controller 110 may correct (interpolate) the selected image restoration filter if necessity arises. For example, the memory 108 stores discrete data of the image pickup state, and the system controller 110 interpolates the image restoration filter at the image restoration time, reducing the capacity necessary to store the image restoration filter in the memory 108.

Next, the system controller 110 sequentially restores an image for each image signal using the image restoration filter at the in-focus position for each wavelength region selected in S18 via the image restoration unit 104d in the image processor 104 (S19). Thus, S19 is the restoration step.

Figure 4A:
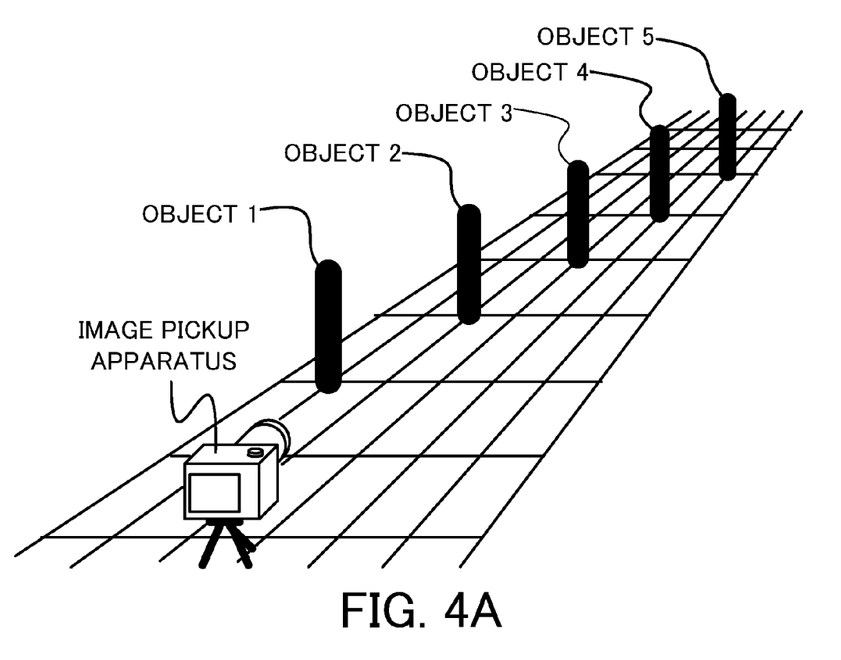
FIG. 4A is a perspective view when the image pickup apparatus illustrated in FIG. 1 takes an image of a three-dimensional object.

FIG. 4A is a perspective view in which the image pickup apparatus takes images of the object 1 to 5 that are black rods arranged from a close point to a distant point, and the image pickup apparatus is focused on the third object 3. The objects 1 and 2 are located at a close range, and the objects 4 and 5 are located at a long range. The positions of the objects 1 to 5 shift in the lateral positions.

Figure 4B:
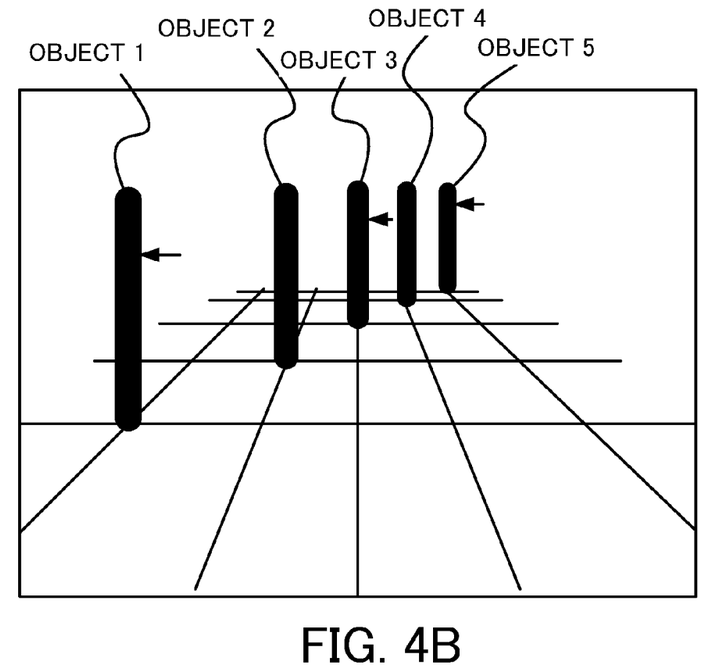
FIG. 4B is an image taken by the image pickup apparatus in FIG. 4A.

FIG. 4B are images of the objects 1-5 taken by the image pickup apparatus illustrated in FIG. 4A, in which the object 3 is located at the in-focus position for each of the RGB chromatic components.

Figure 5A:
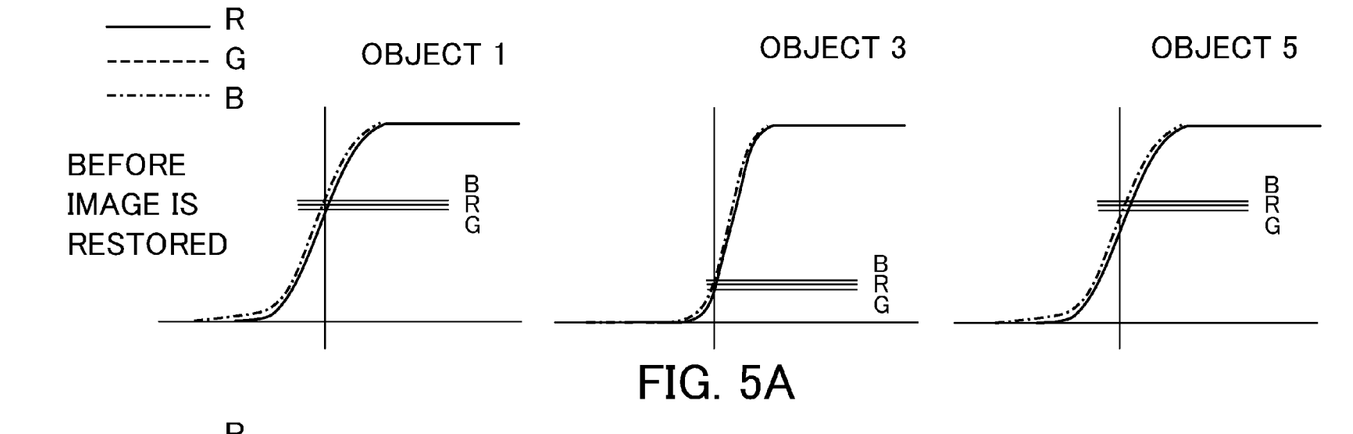
FIG. 5A illustrates sectional views of arrow parts of the objects 1, 3, and 5 illustrated in FIG. 4B before images are restored.

FIG. 5A illustrate sectional views of arrow parts of the objects 1, 3, and 5 illustrated in FIG. 4B before the images are restored. This image is made by synthesizing three images obtained from taking images of the object 3 at the in-focus position for the RGB chromatic components. In other words, FIG. 5A is a synthesis image of three images taken at the first in-focus position to the third in-focus position illustrated in FIG. 3, and each of the RGB components is formed on the image pickup surface of the image pickup element 102.

Since the RGB lights are focused in FIG. 5A, each component has approximately the same edge and a blur amount is least on the section of the object 3. On the other hand, for the object 1 (short range) and the object 5 (long range), the RGB components approximately similarly spread on the image pickup surface of the image pickup element 102. This is an explanation of the longitudinal chromatic aberration, but a chromatic fluctuation at a position having an angle of view is subject to a similar phenomenon although a basic imaging characteristic has an asymmetry.

On the other hand, according to the prior art, on the section of the object 3 (first object) before the image is restored, only the G component is focused and the R and B components are defocused with approximately similar defocus amounts from the G light. When this is applied to FIG. 3, this state corresponds to a state in which the G component at the first in-focus position forms an image on the image pickup surface of the image pickup element 102 whereas the RB components spread on the image pickup surface of the image pickup element 102.

In addition, on the section of the object 1 (short range) (second object) before the image is restored in the prior art, the B component is close to the imaging state on the image pickup surface of the image pickup element 102 and the GR components spread on the image pickup surface of the image pickup element 102. Moreover, on the section of the object 5 (long range) (second object) before the image is restored in the prior art, the R component is close to the imaging state on the image pickup surface of the image pickup element 102 and the GB components spread on the image pickup surface of the image pickup element 102.

Figure 5B:
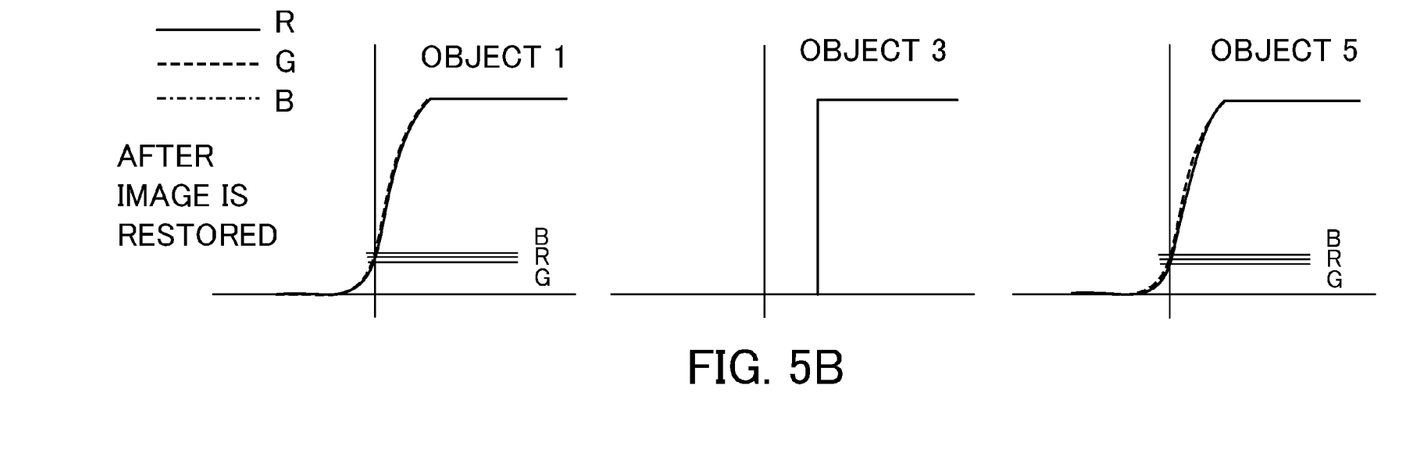
FIG. 5B illustrates their sectional views after the images are restored.

FIG. 5B illustrates sectional views of arrow parts of the objects 1, 3, and 5 illustrated in FIG. 4B after the image is restored. According to this embodiment, the image restoration filters used for the image restorations are designed optimal to the first in-focus position to the third in-focus position for the respective chromatic components. Thus, after the image is restored, the aberration is corrected and the defocused edge is well-corrected at each position.

Since the image is restored so as to approximately maintain a relationship among correction amounts of the RGB components, differences of defocus amounts among the chromatic components which cause a false color are maintained insignificant and the false color is effectively restrained.

On the other hand, according to the conventional image restoration, the defocused edge of the object 3 is well-corrected similar to this embodiment. Although the B component of the object 1 is moderately corrected, the correction effects of the GR components are not conspicuous. This is because at a short range, the B component is close to the imaging state whereas the GR components spread and thus the MTF indicates deteriorations of the RG components. Moreover, although the R component of the object 5 is moderately corrected, the correction effects of the GB components are not conspicuous. This is because at a long range, the R component is close to the imaging state but the BG components spread and thus the MTF indicates deteriorations of the BG components.

Since the image restoration filter used for the conventional image restoration is designed to optimize an improvement of the MTF at the in-focus position of the object 3, a false color may occur when this filter is applied to a defocus distance, such as a short range or a long range. In other words, at a position other than the position of the object 3, scatters of the defocus amounts of the chromatic components increase and a false color on the edge part may occur.

Next, the system controller 110 synthesizes the restored image signals for respective chromatic components via the image synthesizer 104e in the image processor 104, and finally generates a clear color image (S20).

Thereafter, the system controller 110 stores the restored image in the recording medium 109. The system controller 110 may display on the display unit 105 a post-process image or a pre-process image, or a simplified processed image.

As described above with reference to FIG. 3, this embodiment drives the focus lens 101b, but may drive the image pickup element 102 for focusing. In this case, the system controller 110 may determine a moving amount of the image pickup element 102 in S12.

Instead of S18, the system controller 110 may select a restoration filter of a reference wavelength from the memory 108. The reference wavelength is, for example, a green wavelength region corresponding to the G component as the first wavelength region. As illustrated in FIGS. 5A and 5B, the longitudinal chromatic aberration is corrected in the image signal of this embodiment, and the image signal of each chromatic component has an approximately similar defocus characteristic. Therefore, the image restoration filter at the in-focus position for the reference wavelength can be applied to the image signals of the second and third wavelength regions. Common use of the image restoration filter can save the number of filters and reduce necessary capacity of the memory 108. Next, in S19, the system controller 110 sequentially restores an image of the image signal for each wavelength region utilizing the image restoration filter at the in-focus position for the reference wavelength. Thereby, an effect similar to FIG. 5 can be obtained.

Between S19 and S20, the system controller 110 may execute a geometric conversion process for a restored image for each wavelength region so as to correct the longitudinal chromatic aberration or a distortion.

Moreover, the image processing method of this embodiment is not limited to one that is executed by the system controller 110 in the image pickup apparatus and may be performed by a personal computer ("PC") connected to the image pickup apparatus via a USB cable, etc. (not illustrated). In other words, the image processing apparatus configured to execute the image processing method of this embodiment may be an image pickup apparatus, a PC, or an output unit, such as a printer connected to the image pickup apparatus.

The image processing method may be stored in a memory (not illustrated) in the PC or a storage (such as a HDD of a server connected via the Internet) which is connected to the PC through a network. The image processing method may contain a development and another image processing function as well as the image restoration process.

For example, the PC (not illustrated) may obtain an image signal for each wavelength and information of the condition of photography at that time from the image pickup apparatus or the recording medium (or external storage). The information of the condition of photography may be information separate from or embedded in the image signal. Thereafter, the PC executes S18 to S20 in the image processing method.

If necessary, the PC may display a pre-restoration image, a post-restoration image, and another processed image on a display (not illustrated) or print one of them on a printer (not illustrated).

Assume an image processing system in which any of the image pickup apparatus, the PC, and the output unit can execute an image processing method of this embodiment in a network that connects them to one another. Then, an apparatus that executes the image processing method utilizes correction data.

The correction data contains identification information of the executing apparatus, identification information and individual information of the image pickup apparatus, information of an image pickup state (detected by the image pickup state detector 107), information of a plurality of image restoration filters (stored in the memory 108), and user setting information.

The identification information of the executing apparatus contains identification information of an apparatus configured to execute the image restoration among the image pickup apparatus, the PC, and the output unit, and information of data to be transferred. For example, when the image pickup apparatus executes the image restoration, it is unnecessary to transfer a pre-restoration image and an image restoration filter. When the PC executes the image restoration, the PC obtains a pre-restoration image, an image restoration filter, and information of an image pickup state. In this case, the PC may obtain an image restoration filter preselected by the image pickup apparatus, or the PC may obtain a plurality of image restoration filters from the image pickup apparatus and the PC may select the image restoration filter used for the image restoration.

The identification information of the image pickup apparatus is identification information of the image pickup apparatus that has taken the image, and includes a combination between the image pickup lens (image pickup optical system 101) and the camera body when they are exchangeable from each other. The identification information of the image pickup apparatus is individual information to the identification information of the image pickup apparatus. Due to scattering manufacture errors, the OTF of the image pickup apparatus may have an individual difference and thus the individual information of the image pickup apparatus is used to set an optimal image restoration filter.

The user setting information is a parameter which a user has set. Use of the user setting information can always provide a preferred output image as an initial value. The user setting information may be updated with the most preferable parameter using a learning function and the user's history of determining the adjustment parameters. Moreover, a manufacturer of the image pickup apparatus may provide preset values corresponding to some sharpness patterns through the network, etc.

The correction data may be annexed to or correlated with an individual image signal. The contents of the correction data may be automatically or manually changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus is applicable to an application of taking an image of an object.

This application claims the benefit of Japanese Patent Application No. 2010-080747, filed Mar. 31, 2010 which is hereby incorporated by reference herein in its entirety.

What is claimed is:

1. An image processing apparatus comprising:
an image obtaining unit configured to obtain a plurality of images of an in-focus first object via an optical system, each of the plurality of images having in-focus a different one of a plurality of light wavelength regions;
an image pickup information obtaining unit configured to obtain an image pickup state associated with the obtaining of each of the plurality of images by the image obtaining unit;
an optical transfer function obtaining unit configured to obtain an amount corresponding to an optical transfer function of the optical system at each image pickup state;
an image restoration unit configured to restore each respective image of the plurality of images based at least upon the amount corresponding to the optical transfer function of the optical system at the image pickup state associated with the obtaining of the respective image of the plurality of images by the image obtaining unit; and
an image synthesizer configured to synthesize a plurality of images that have been restored by the image restoration unit,
wherein, when the plurality of images includes a second object in addition to the in-focus first object, the image restoration unit is configured to perform the restoring at least by using the amount corresponding to the optical transfer function for each light wavelength region used to obtain the plurality of images of the in-focus first object to restore images of both the first object and the second object.

2. The image processing apparatus according to claim 1, wherein the image processing apparatus is configured to correct a lateral chromatic aberration of the optical system through a geometric conversion.

3. An image pickup apparatus comprising an image processing apparatus according to claim 1.

4. An image processing method comprising the steps of:
obtaining, by an image obtaining unit, a plurality of images of an in-focus first object via an optical system, each of the plurality of images having in-focus a different one of a plurality of light wavelength regions;
obtaining an image pickup state associated with the obtaining of each of the plurality of images by the image obtaining unit;
obtaining an amount corresponding to an optical transfer function of the optical system at each image pickup state;
restoring, by an image restoration unit, each respective image of the plurality of images based at least upon the amount corresponding to the optical transfer function of the optical system at the image pickup state associated with the obtaining of the respective image of the plurality of images by the image obtaining unit; and
synthesizing images that have been restored by the image restoration unit,
wherein, when the plurality of images includes a second object in addition to the in-focus first object, the image restoration unit performs the restoring at least by using the amount corresponding to the optical transfer function for each light wavelength region used to obtain the plurality of images of the in-focus first object to restore images of both the first object and the second object.

5. A non-transitory computer-readable storage medium storing a computer-executable program, the program comprising:
- image obtaining instructions configured to obtain a plurality of images of an in-focus first object via an optical system, each of the plurality of images having in-focus a different one of a plurality of light wavelength regions;
- image pickup information obtaining instructions configured to obtain an image pickup state associated with the obtaining of each of the plurality of images according to the image obtaining instructions;
- optical transfer function obtaining instructions configured to obtain an amount corresponding to an optical transfer function of the optical system at each image pickup state;
- image restoration instructions configured to restore each respective image of the plurality of images based at least upon the amount corresponding to the optical transfer function of the optical system at the image pickup state associated with the obtaining of the respective image of the plurality of images according to the image obtaining instructions; and
- image synthesizer instructions configured to synthesize images that have been restored by the restoration unit,
- wherein, when the plurality of images includes a second object in addition to the in-focus first object, the image restoration instructions are configured to perform the restoring at least by using the amount corresponding to the optical transfer function for each light wavelength region used to obtain the plurality of images of the in-focus first object to restore images of both the first object and the second object.

* * * * *